Jan. 4, 1966   L. J. LEEMHUIS   3,227,369
AIR FLOW CONTROL DEVICES
Filed June 28, 1962   2 Sheets-Sheet 1

INVENTOR.
LOUIS J. LEEMHUIS
BY
Miketta and Glenny
ATTORNEYS.

Jan. 4, 1966 L. J. LEEMHUIS 3,227,369
AIR FLOW CONTROL DEVICES
Filed June 28, 1962 2 Sheets-Sheet 2
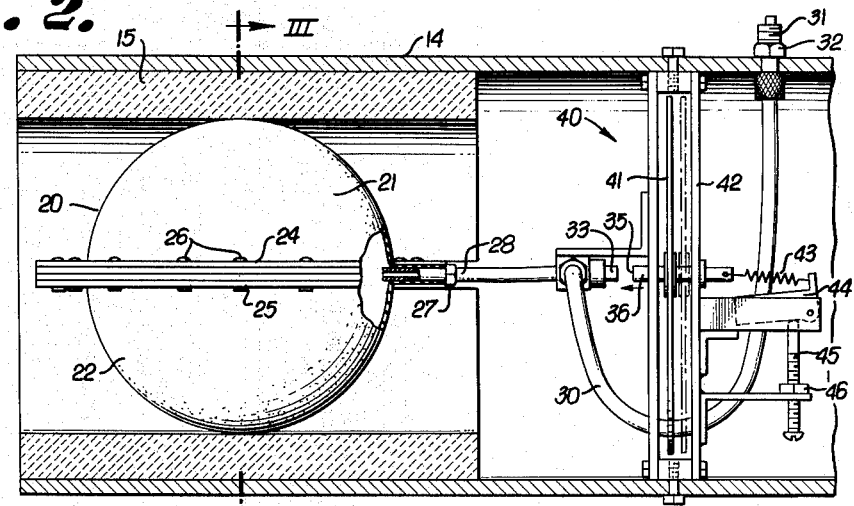
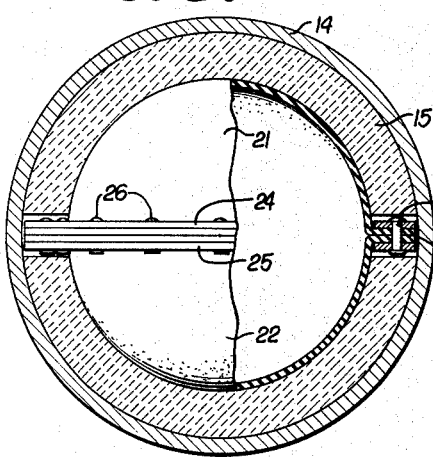
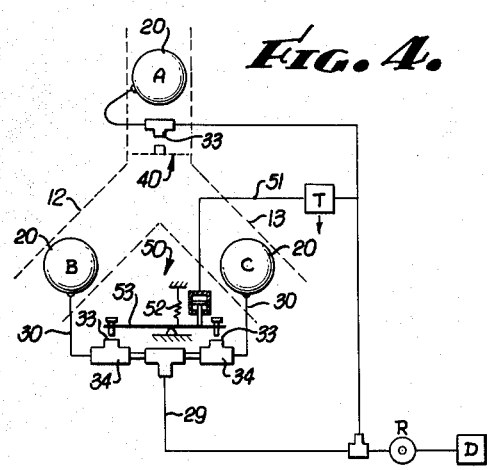
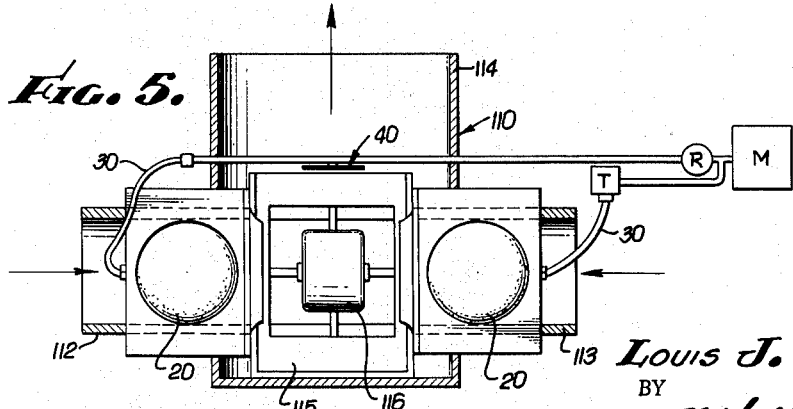
INVENTOR.
LOUIS J. LEEMHUIS
BY
Miketta and Glenny
ATTORNEYS.

United States Patent Office 3,227,369
Patented Jan. 4, 1966

3,227,369
AIR FLOW CONTROL DEVICES
Louis J. Leemhuis, West Covina, Calif., assignor to Barotherm Corporation, Covina, Calif., a corporation of California
Filed June 28, 1962, Ser. No. 206,006
3 Claims. (Cl. 236—13)

This invention relates in general to air control devices adapted to receive air from different sources at different temperatures, selectively blend or mix such air to provide a desired temperature and supply such mixed or blended air from the devices at a constant volume rate of flow. More particularly, the invention relates to a novel form of air valve characterized by the absence of mechanical linkage means which is employed in a novel manner with air ducts, air flow sensing devices and thermostats to produce such air control devices in an uniquely effective economical trouble free manner.

The normal air conditioning system of the past has generally had only a single duct carrying either hot or cold air at any given time to supply the various rooms serviced by the system. As most everyone has experienced, only the room in which the thermostat is located is maintained at the desired temperature, the other rooms serviced having no individual control. In order to provide multizone control, the use of dual duct systems and modifications thereof have been employed to supply each room or zone with air from two different sources at two different temperatures, generally hot and cold. An air mixing box or blender is then provided in each room to receive the air, mix it to a desired temperature and then exhaust it into the room. Such mixing boxes have normally required complicated mechanical linkage means and valves to regulate the flow of air into the mixing box from each source of air. Further, since the different sources of air normally are supplying air at different air flow pressures, such as a line lower flow pressure, the blending or mixing device exhausts air into the zone at widely varying flow rates. Such non-constant volume flow rate of air supplied to a room or zone not only cause undesirable changes in the nose level of the device, calling attention to its presence, but prevents proper supplying of the room or zone with fresh air in a uniform manner.

It is therefore an object of my invention to disclose and provide an air mixing and volume control device for installation in each zone of an air conditioning system which is characterized by its absence of mechanical linkages and which is adapted to receive air at different temperatures from different sources at different pressures selectively mix said air to a desired temperature and exhaust the mixed air into the room or zone supplied by the device in a constant volume rate of air flow.

It is another object of my invention to disclose and provide an air volume regulator device for installation in a conventional air duct which is adapted to sense the pressure of air flow entering said duct, variably open and close the duct in response to changes in said air flow pressure without the need for mechanical linkages and maintain constant volume air flow through said duct.

It is a further object of my invention to disclose and provide an air blending and volume regulating device employing air valve means in each of a plurality of inlet conduits and an outlet conduit adapted to variably expand within each of said conduits to control passage of air through said conduits in response to selected temperature and volume requirements for the room or zone supplied.

It is a still further object of my invention to disclose and provide a novel expandable air valve member adapted to control air flow through an air duct without the need for mechanical linkages or valve seats as employed in the usual air valve.

Generally stated, my invention comprises the provision of an expandable member adapted to be disposed within an air duct and be variably expanded to regulate the passage of air through the duct. Such an expandable member may be used with an air volume sensing device to provide an air volume regulating device in a single duct where the expansion of the member within the duct is varied in response to the variations in pressure of air flow entering the duct. Also, a plurality of such expandable members may be employed in some or all of a plurality of ducts in an air blending device along with thermostat controls and an air volume sensing device to provide an air blending and volume regulating mixing device.

More particularly, the invention contemplates the provision of an expandable member formed by a pair of sheet-like elastic elements having marginal surface areas secured together, providing an inner cavity adapted to be filled with compressed air to expand the member. A pair of opposed circularly ported plates are positioned overlying the sheet-like elements and clamped together.

The elastic elements are thus allowed to expand through the plates into a sphere-like shape, closing off the air duct in which they are disposed, when fully inflated. The means of supplying the compressed air to the expandable member may be provided wtih an air bleed orifice. By regulating the amount of air bleed, the amount of expansion of the element may be variably controlled. Such air bleed may be varied in response to change in the room temperature acting on a room thermostat, or in response to change in air flow pressure in an air duct acting on air volume sensing means disposed in the duct. A more detailed explanation of the expandable member and air control devices employing it, according to the invention, will be described in the following detailed explanation of exemplary embodiments of the invention. Further objects and advantages will become apparent to one skilled in the art by his consideration of these exemplary embodiments disclosed. Reference will be made to the appended sheets of drawings in which:

FIG. 2 is a detailed view of the expandable valve member and volume sensing means of the device of FIG. 1 taken therein along the plane II—II;

FIG. 3 is a transverse view of the exemplary expandable member of FIG. 2 taken therein along the plane III—III;

FIG. 4 is a schematic representation of the compressed air system and control means for the air control device of FIGS. 1, 2 and 3;

Figure 6:
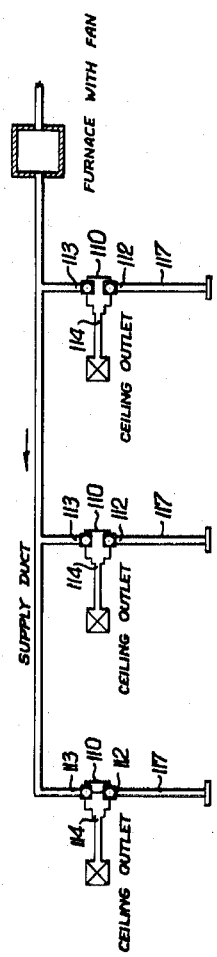

FIG. 5 is an alternative exemplary embodiment of the air mixing and volume control device according to the invention employing an air boosting fan in a central portion thereof; and FIG. 6 is a plan view of an exemplary air conditioning system having a single supply duct common to each zone and individual auxiliary supply ducts to each zone from an exterior source of air, the system employing the exemplary embodiment of FIG. 5.

Figure 1:
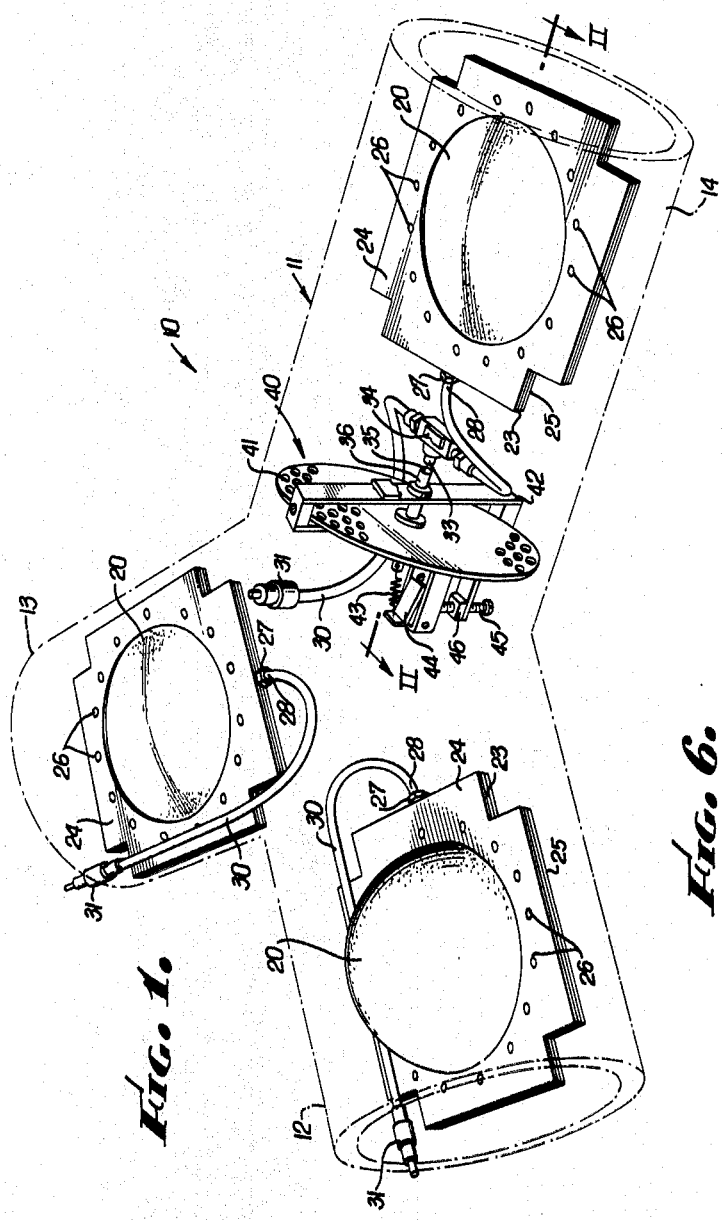
FIG. 1 is an exemplary embodiment of an air mixing and volume regulating air control device, according to the invention, employing exemplary expandable air valve members and volume sensing means within a housing shown in phantom lines.

Referring first to FIGS. 1, 2 and 3, an exemplary embodiment of air control device 10 adapted for use in a dual duct air conditioning system will be described. It is contemplated that a supply of hot air and cold air, both under pressure, is available to a room or zone in two separate ducts, the air thus being delivered from different sources, at different temperatures and different air flow pressures. The air blending or mixing and volume control device of FIG. 1 is adapted to receive such air, mix it to a desired temperature and exhaust it into the room or zone at a constant volume rate of air flow.

Air control device 10 is comprised of a casing or housing 11, indicated in phantom line in FIG. 1, having a pair of inlet conduits 12 and 13 and a single outlet conduit 14. The conduits 12, 13 and 14 are in common communication with one another so that air entering either or both conduits 12 and 13 will exit through outlet conduit 14. The inner surface of the casing is lined with a suitable thermal and acoustic insulation 15. Insulation 15 is preferably coated on its inner exposed surface to prevent air erosion and is securely attached to the inner surface of the casing 10 to avoid detachment therefrom due to air turbulence or vibration. Conventional air ducts may be interconnected to the inlet conduits 12 and 13 while conduit 13 may exhaust into a sound attenuator, into the room or zone or into a short discharge duct leading into the room or zone serviced.

Expandable members 20 may be provided in each of the inlet conduits 12 and 13 and outlet conduit 14. As more clearly shown in FIGS. 2 and 3, each expandable member 20 includes a pair of sheet-like elastic elements 21 and 22. These elements may be made of rubber such as a neoprene and are secured together along marginal areas 23. When rubber sheet-like elements 21 and 22 are employed, the marginal areas may be vulcanized together. Such vulcanization of the marginal areas of the elastic elements 21 and 22 provides an air tight seal about the outer edges of these elements such that when a supply of compressed air is introduced in between the elements they will elastically expand in balloon fashion. Ported circular plates 24 and 25 are positioned overlying elements 21 and 22 to provide added reinforcement to the marginal areas, to facilitate positioning of the elastic elements within the air duct and to direct the expansion of the elastic elements through the ports. The plates 24 and 25 clamp the elements 21 and 22 together about their generally marginal areas as shown in FIGS. 1, 2 and 3 and are held in such clamped position by a plurality of bolts or rivets 26. Plates 24 and 25 are circularly ported to allow the sheet-like elements 21 and 22 to expand therethrough in such manner that the elastic member approximates a sphere-like shape when inflated. While other shaped ports in plates 24 and 25 could be used, allowing differently shaped expansion of the elastic expandable member 20, the generally sphere-like shape of member 20 is preferred because it presents a very smooth aerodynamic surface to the passage of air between member 20 and the inner walls of the ducts when the member is less than fully expanded to a duct closing position.

Nipple means are provided on the elastic member to adapt it for the reception of compressed air between the elements 21 and 22. Such nipple means may comprise a conventional rubber nipple vulcanized onto one of the elastic members. However, I have found that such attachment of a nipple to one of the elastic members causes non-uniform expansion of the members. Thus, according to the preferred embodiment, the nipple means includes a nipple or fitting 27 fastened to the plates 24 and 25 and communicating with the interior of the elastic member between the elements 21 and 22. Each expandable member 20 is further adapted to receive compressed air by the provision of air hose means adapted to interconnect the member with a source of compressed air. Such air hose means may comprise a conventional air hose adapted at one end by a connector 28 to be connected with the nipple means 27 and adapted at the other end by a connector 31 to be interconnected with a source of compressed air. As shown in FIG. 2, the connector 31 on the air hose means 30 disposed within the outlet conduit 14 may be fixedly held in the wall of the casing by bolt means 32. Connectors 31 on the air hose means associated with the expandle members 20 in the inlet conduits 12 and 13 may be similarly fastened to the casing wall. The embodiment of FIGS. 1, 2 and 3, therefore, is adapted to employ three separate expandable members 20 wherein each is adapted to be variably inflated and deflated through independent air hose means interconnected with a source of compressed air. The supply of such compressed air to each of the expandable members 20 may be varied by control means to selectively regulate the air flow to each of the conduits 12, 13 and 14 in order to provide a proper mixing of the hot and cold air entering the casing 11 and to control the rate of air flow out of the outlet conduit 14 to provide a constant volume rate of air flow discharge into the room or zone supplied by the device. Each expandable member 20 acts as an air valve and is characterized by the complete absence of any complicated mechanical linkages or levers.

Air volume control is effected by the provision of an air volume regulator within the outlet conduit of the embodiment of FIGS. 1, 2 and 3. Such air volume regulator includes the inflatable elastic member 20 adapted to be disposed within the outlet conduit 14, air hose means 30, adapted to interconnect the elastic member 20 with a source of compressed air to cause inflation of the elastic member, an air bleed orifice 33 in the hose means and a volume sensing device, indicated generally at 40, also disposed within the air duct or conduit 14. Air bleed orifice 33 may be provided in the hose means 30 by a conventional fitting 34 having a bleed orifice 33. Bleed orifice 33 may be of sufficient size that when the air hose means 30 is connected with a source of compressed air, the expandable member 20 will not become inflated as long as the discharge air flow from orifice 33 is not obstructed. Thus, orifice 33 must be larger than the internal diameter of the air hose means 30. Means for selectively obstructing the air flow from orifice 33 is provided to variably control the rate of discharge of air from such orifice to cause controllable inflation and deflation of the expandable member 20. Such air flow obstruction means comprises, in the preferred embodiment, a neoprene seat 35 formed on a stem 36 opeably associated with a volume sensing device indicated generally at 40. The bleeding of air from air hose means 30 to orifice 33 thus may be variably controlled in response to the flow of air entering the outlet conduit 14 in order to cause variable inflation of the expandable member 20 in response to changes in the flow rate of air entering the outlet conduit.

Air flow rate sensing means, indicated generally at 40, includes a pressure sensing ported plate 41 axially slidably mounted within a frame 42 disposed transversely of the conduit 14. Ported plate 41 is mounted generally coaxially within the duct or conduit in which it is disposed and it is adapted to slide along its axes within said duct in response to changes in air flow pressure exerted upon it by the air entering outlet conduit 14 from the inlet conduits 12 and 13. Spring means 43 are provided to bias the ported pressure plate 41 against the flow of air entering the outlet conduit. Such spring means 43 may be adjusted to change the amount of tension exerted upon the plate, spring means 43 being connected to stem 36 which in turn supports ported plate 41 and is slidably journaled within the frame 42. Means for adjusting the spring tension to vary the bias of the pressure plate 42 against yieldable movement under pressure of air flow entering outlet conduit 14 includes a pivotally mounted block 44 and adjustable screw means 45. It is apparent from FIGS. 1 and 2 that by adjusting the position of screw 45, block 44 will assume varying positions about its pivot point causing varying tensions on spring means 43. A lock nut 46 may be provided to secure pin means 45 in its selected position.

To operate the air volume regulator, the spring means 43 is set to initial tension. Air flow entering the outlet conduit 14 will bear upon pressure plate 41 causing it in turn to move stem 36 and seat 35 into proximity with bleed orifice 33 obstructing the flow of air from the bleed orifice. Such obstruction of bleed orifice 33 will cause an inflation of expandable member 20. The system will balance itself, at a given volume rate of air flow, since as the expandable member 20 enlarges the rate of air flow passed plate 41 will be reduced. The rate of air flow at which the system balances may be varied by adjusting the position of the screw 45 to vary the tension of spring 43. Once the system has balanced itself to a given rate of air flow, it will tend to maintain that rate since a drop in air flow entering outlet conduit 14 will cause deflation of expandable member 20 while an increase in rate of air flow entering outlet conduit 14 will cause an expansion of expandable member 20. The expandable member 20 is thus responsive to variations in air flow pressure within the duct itself and a pre-selected rate of air flow is maintained constant in order to provide a constant volume rate of air flow discharged from the air control device.

Air blending is accomplished by selectively controlling the amount of inflation of the expandable member 20 is disposed within the two inlet conduits 12 and 13. Means to variably bleed compressed air from the hose means 30 associated with the expandable member 20 in each of inlet conduits 12 and 13 may be provided similar to that in the air hose means 30 previously described with relation to outlet conduit 14. In the preferred embodiment of FIGS. 1, 2 and 3 the expansion of the expandable members 20 in each inlet conduit is varied in inverse proportion to the other by inter-associating the bleed orifices 33 to operate from a single thermostat control. As shown schematically in FIG. 4, the expandable members 20 in inlet conduits 12 and 13, represented as B and C in FIG. 4, are each connected to a source of compressed air, represented at D, by its associated air hose means 30. Each air hose means 30 is provided with a bleed orifice 33 in its fitting 34, fittings 34 being interconnected to a common air hose running to the source of compressed air, indicated at D. A regulator indicated at R may be employed to prevent destructive over-inflation of the expandable members 20. Thermostat means T may be an air bleed type thermostat inserted in air line 51 leading from a source of compressed air to a pivoted rocker arm valving assembly indicated at 50. The force of compressed air from D tends to cause obstruction of the bleed orifice 33 associated with expandable member 20, indicated as C in FIG. 4. The thermostat T is adapted to bleed air from air line 51 to allow the spring means 52 to urge rocker arm 53 into a position where the bleed orifice 33 associated with expandable member 20, indicated as B in FIG. 4, is obstructed. Inversely proportional inflation and deflation of the expandable members in response to changes in room temperature surrounding the thermostat T may thus be effected.

An alternative embodiment of an air control device employing the novel expandable members 20 and the associated control mechanisms, according to the invention, is shown in FIG. 5. A casing 110 is provided with two inlet conduits 112 and 113 and an outlet conduit 114 and a central air mixing chamber 115. The conduits 112, 113 and 114 are in communication with each other through the chamber 115. Air fan and motor means 116 are disposed within the central chamber of the housing 110 adapted to draw air from the inlet conduits 112 and 113 and expel the blended and mixed air through the outlet conduit 114. This air control device is adapted to be used as a booster air mixing and volume control device adapted for use in a single duct air conditioning system as shown in FIG. 6. The air-conditioning system of FIG. 6 has a single supply duct leading from a conditioned air source, shown to be a furnace with fan. Air mixing and volume regulating devices 110, according to the invention and as shown in FIG. 5 are provided in each zone or room to be serviced, such zones having the ceiling outlets shown. Auxiliary air supply ducts 117 leading from an external source of air or an air return inlet positioned in the room or zone serviced are also provided to allow the system to operate like a dual duct system. The ability of the booster device 110 to draw air from the supply duct and auxiliary ducts allows the use of a low pressure single duct type air conditioning system with the effect of a dual duct system having individual room or zone air conditioning controls.

In the control device of FIG. 5, an expandable member 20 is positioned in the inlet conduit 12 and inlet conduit 13. Each member is adapted to be expanded by inflation with compressed air from a compressor or air supply motor means $m$ to variably control the air flow entering the central chamber 115. Air hose means 30, as previously described, are associated with each of the expandable members 20. However, in this embodiment one of the expandable members 20, shown in inlet conduit 113, is employed to control the amount of hot or cold air being supplied to the chamber 115 while the other expandable members 20, shown in inlet conduit 112, is employed to regulate the volume of air leaving the chamber 115. The expandable member 20 in the inlet conduit 113 is provided with an air bleed orifice in the air hose means 30. Such air bleed means is associated with the thermostat indicated at T in order that the expansion of such expendable member 20 is controlled by the temperature of the room or zone supplied by the device. The other expandable member 20, disposed in inlet conduit 112, is associated with an air velocity pressure sensing means disposed within the outlet conduit 114, indicated at 40, and may be constructed as the air velocity pressure sensing device described in relation to the embodiment of FIGS. 1, 2 and 3. Air bleed means in the associated air hose means 30 may similarly be provided and be operably associated with the air velocity pressure sensing means, indicated at 40, as explained in relation to the embodiment of FIGS. 1, 2 and 3 to cause variable inflation of the expandable member 20 within inlet conduit 112 in direct proportion to the air velocity pressure of air flowing through the outlet conduit 114.

It may be seen from the foregoing exemplary embodiments of my invention that an air mixing and volume control device for installation in each zone of an air conditioning system may be provided by my invention. It is characterized by its absence of mechanical linkages and which is adapted to receive air at different temperatures from different sources at different air velocity pressures. The device will selectively mix such air to a desired temperature and exhaust it into a room or zone in a constant volume rate of air flow.

Constant volume rate of air flow through a conventional air duct is provided by the provision of the expandable member, according to the invention, when incorporated with an air velocity sensing device disposed within the duct itself, to provide an air valve within the duct responsive to changes in air velocity pressure of air within the duct maintaining a constant volume air flow through the duct. Also it is possible to mix air from two separate sources at different temperatures to a desired mixed air temperature responsive to a thermostat within the room or zone supplied by a very simple but novel use of the expandable members 20, according to the invention. Employed together, the combination of the expandable members and various control devices hereinbefore described allows the provision of a very effective uniformly operating air blending and mixing device adapted to provide air at a constant volume rate of flow.

The embodiments disclosed herein are exemplary of the invention and the uses of the invention only and further modifications, alterations and adaptations of the invention as well as its uses, may come within the scope of the invention which is described and limited only by the following claims.

I claim:

1. In an air flow control device adapted to provide and maintain constant volume air flow through an air duct which is supplied with air in varying flow rates, said device including an air volume sensing means within said duct to sense the rate of flow of air in the duct, the provision of;

a pneumatically expandable air valve member in said duct and means associated therewith for inflating and deflating said member in response to said air volume sensing means, said air valve member comprising a pair of sheet-like elastic elements having marginal areas secured together, a pair of opposed circularly ported plates overlying said elements and clamping said marginal areas together, said plates being ported to allow central portions of said elements to expand therethrough when inflated, and nipple means for providing passage for compressed air in between said elements.

2. In an air blending and volume controlling device including a housing having two cylindrical air inlet conduits and one cylindrical air outlet conduit in common communication with each other, the provision of:

a pneumatically expandable elastic means in each of at least two of said conduits for closing the associated conduit to the passage of air therethrough upon full expansion of said elastic means within said associated conduit;

mounting means within each of said two conduits for mounting the associated elastic means at a longitudinal mid-plane of the conduit to allow air passage through said conduit on opposite sides of said elastic means when said elastic means is other than fully inflated; and means for inflating and deflating one of said elastic means in response to a thermostat and means to inflate and deflate the other of said elastic means in response to variations in the volume of air flow through said outlet conduit; wherein each of said elastic means includes a pair of opposed sheet-like elastic elements having marginal areas secured to each other and engaged by said mounting means and each of said elastic means being expandable outwardly from said mid-plane of the associated conduit to form a hollow generally spherical shape abutting the interior wall of said associated conduit, further expansion of said elastic means beyond said spherical shape being restrained by the surrounding associated cylindrical conduit.

3. In an air blending and volume controlling device including a housing having a plurality of air inlet conduits and at least one air outlet conduit in common communication with each other, an air volume sensing means associated with said outlet conduit, and a thermostat means associated with a space supplied with air from said device, the provision of:

a pneumatically expandable air valve means within each of said conduits for selectably controlling the proportion of air entering said device through each inlet conduit in response to said thermostat means and controlling the volume of air leaving said outlet conduit in response to said air volume sensing means, each of said air valve means including a pair of sheet-like elastic elements having marginal areas secured together to provide a single air receiving chamber therebetween;

mounting means in each conduit for mounting the associated air valve means in a longitudinal mid-plane of the conduit, said mounting means including a pair of opposed circularly ported plates overlying said elastic elements and clamping said marginal areas together; and hose means associated with each of said air valve members to provide passage for compressed air from a source thereof to said chamber in between said opposed elastic members, said elastic members of each expandable air valve means expanding from said mid-plane of the associated conduit through said ported plates to a generally hollow spherical shape abutting the interior walls of the surrounding conduit upon full inflation thereof.

References Cited by the Examiner
UNITED STATES PATENTS

| | | | |
|---|---|---|---|
| 384,284 | 6/1888 | Rowland | 137—504 |
| 543,448 | 7/1895 | Lowe | 137—497 X |
| 2,598,207 | 5/1952 | Bailey et al. | 251—61 |
| 2,793,812 | 5/1957 | McDonald | 236—13 |
| 2,815,915 | 12/1957 | Salerno | 236—13 |
| 2,821,343 | 1/1958 | Payne | 236—13 |
| 2,822,132 | 2/1958 | McDonald et al. | 236—13 |
| 2,880,752 | 4/1959 | Kreuttner. | |
| 3,038,488 | 6/1962 | Welch et al. | 251—61 |
| 3,053,454 | 9/1962 | Waterfill | 236—13 |
| 3,117,723 | 1/1964 | Church | 236—49 |

FOREIGN PATENTS 714,738   9/1954   Great Britain.

WILLIAM F. O'DEA, *Acting Primary Examiner.*
ALDEN D. STEWART, EDWARD J. MICHAEL,
*Examiners.*